June 17, 1930. G. P. ADAMSON 1,764,593
METHOD OF GENERATING HYDROCHLORIC ACID GAS
Filed Feb. 5, 1927
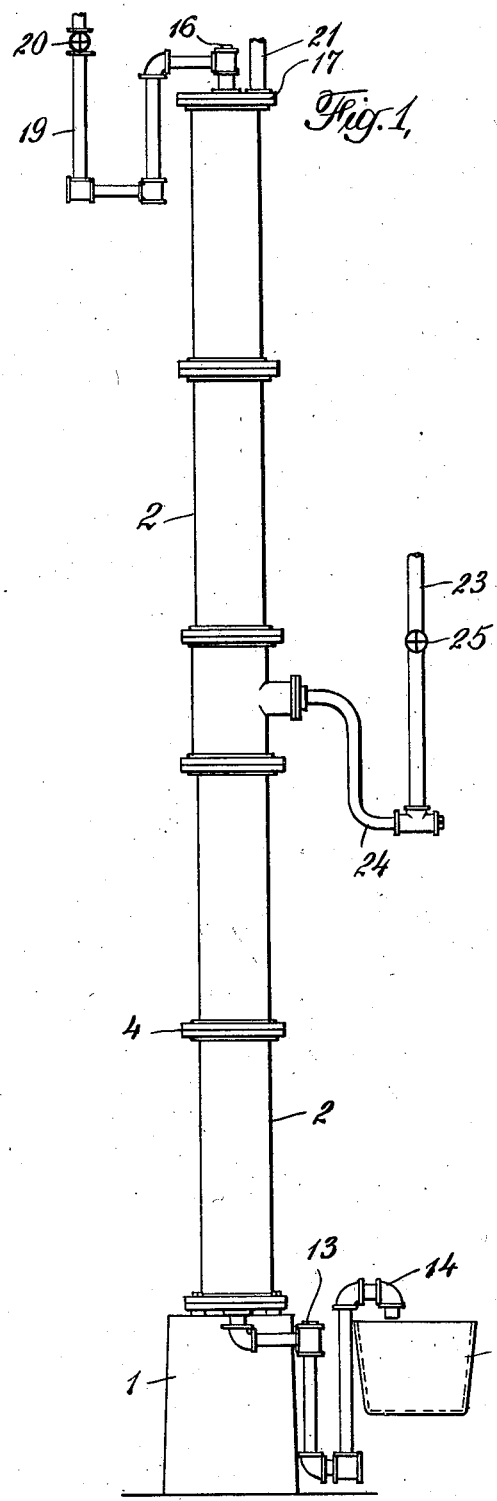
Fig. 1,
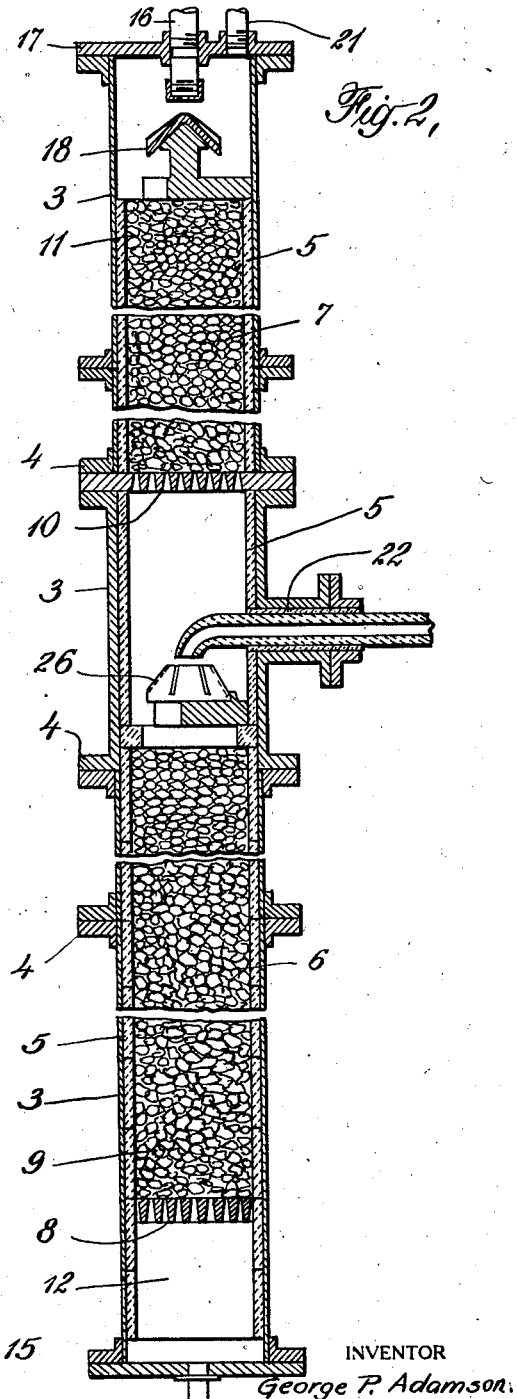
Fig. 2,
INVENTOR
George P. Adamson,
BY
Forbes Silsby
ATTORNEY Patented June 17, 1930

1,764,593

UNITED STATES PATENT OFFICE

GEORGE P. ADAMSON, OF NEW YORK, N. Y., ASSIGNOR TO GENERAL CHEMICAL COMPANY, OF NEW YORK, N. Y., A CORPORATION OF NEW YORK

METHOD OF GENERATING HYDROCHLORIC-ACID GAS

Application filed February 5, 1927. Serial No. 166,037.

This invention relates to a method of and apparatus for producing dry hydrochloric acid gas, and more particularly for producing such hydrochloric acid gas by the interaction of sulphuric acid and hydrochloric acid solution.

An object of my invention is to provide an easily regulated and rapid process for the continuous production of dry, substantially 100% hydrochloric acid gas from hydrochloric acid solution. A further object is to provide a novel apparatus which is simple in construction and durable and efficient in operation for carrying out my improved process.

In the accompanying drawings, Fig. 1 represents in elevation a form of apparatus embodying my invention, and Fig. 2 represents an elevation in section of the hydrochloric acid gas generating tower. Similar characters of reference indicate similar elements throughout the several figures.

Referring now to the accompanying drawings, in detail, the numeral 1 indicates the base or foundation for the hydrochloric acid gas generating tower or column 2. The tower consists of a rigid, gas-tight shell or container 3, preferably cylindrical in shape and constructed of sections of steel or iron suitably united by flanges 4. The interior thereof is covered with a lining 5 of earthenware tile, acid proof brick, or other suitable corrosion resisting material.

The tower or column is divided into a lower or gas generating chamber 6 and an upper or gas drying chamber 7. The lower chamber is provided with a grill 8 of cast iron for supporting the packing 9 in such chamber, while a second grill 10, located substantially midway of the tower, constitutes a support for the packing 11 in the upper chamber 7. Below the lower grill 8 is an acid pit 12 where the waste acid from the process may collect and from which it is discharged through the outlet 13 and trap overflow 14 to the tank 15.

An inlet 16 for sulphuric acid is provided in the top 17 of the tower or column. Directly beneath the inlet is an earthenware distributing cone 18, which serves to uniformly distribute the acid to the packing 11. The acid inlet line is provided with a trap 19 to prevent the escape of gas, and with a suitable valve 20 for regulating the flow of acid. An outlet 21 is provided at or near the top of the tower for the removal of the hydrochloric acid gas generated. Just below the upper grill 10 is an inlet for hydrochloric acid solution, preferably constructed of earthenware tile. This inlet is connected with the supply line 23, thru the trap 24. A suitable valve 25 is provided in the supply line, whereby the flow of hydrochloric acid solution may be regulated. Situated in the tower and below the inlet 22, is an earthenware distributing cone 26, which serves to uniformly distribute the hydrochloric acid solution to the packing 9.

In carrying out my improved process, the operation of the apparatus is as follows:

Sulphuric acid, preferably of a strength of about 93–98% is continuously introduced through the supply line and trap to the inlet 16. The acid falling upon the cone 18 is uniformly distributed to the packing 11 in the upper chamber 7 and flows downwardly therethrough. The acid flowing through the grill 10, drops upon the packing 9 in the lower chamber 6. Hydrochloric acid solution, preferably of a strength of about 20 to 22° Bé. is continuously fed into the tower through the supply line 23, trap 24, and inlet 22. This acid, flowing from the inlet onto the cone 26, is uniformly distributed over the top of the packing 9 and flows downwardly therethrough. The stream of fresh, strong sulphuric acid continuously flowing from the upper chamber contacts in co-current flow with the hydrochloric acid solution in the packing 9 and absorbs the water from the latter acid with the liberation of considerable heat. The heat thus developed serves to drive off substantially all of the hydrochloric acid in the form of a gas, and the gaseous hydrochloric acid, together with some water vapor, pass upwardly into the upper chamber 7. Here the gaseous products from the lower chamber contact in counter-current flow with the descending strong sulphuric acid, and the moisture is entirely removed so that hydrochloric acid gas, dry and of practically 100% concentration may be continuously withdrawn thru the outlet 21. The concentrated sulphuric acid is but slightly diluted in the drying operation and passes to the lower chamber as fresh strong acid.

The dehydration of the hydrochloric acid solution in the lower chamber 6 dilutes the concentrated sulphuric acid and if the dilution is permitted to proceed beyond a certain limit the interaction of the acids is not complete. Accordingly, I prefer to regulate and proportion the flow of the several acids by the valves 20 and 25, so that the concentration of the sulphuric acid leaving the tower shall not be below 60° Bé. Under these conditions, the interaction of the acids in the lower chamber 6 will be complete, and the diluted sulphuric acid resulting from the dehydration of the hydrochloric acid solution will contain substantially no hydrochloric acid. The acid from the reaction is collected in the pit 12 and continuously withdrawn through the outlet 13 and overflow 14 to the tank 15.

It will thus be seen that my invention provides a rapid and efficient method for the continuous production of pure dry hydrochloric acid gas. While I have herein shown and described the preferred embodiment of my invention, I wish it to be understood that I do not limit myself to the precise details herein set forth, as modifications and variations may be made without departing from the spirit of the invention or exceeding the scope of the appended claims.

I claim:

1. The herein described process of producing dry hydrochloric acid gas which consists in continuously contacting hydrochloric acid solution with concentrated sulphuric acid thereby generating moist hydrochloric acid gas, and passing the moist hydrochloric acid gas in counter-current flow in contact with the incoming concentrated sulphuric acid prior to its contact with the hydrochloric acid solution.

2. The herein described process of producing dry hydrochloric acid gas which comprises the steps of maintaining a descending stream of concentrated sulphuric acid, continuously introducing hydrochloric acid solution into said stream at a point intermediate the length thereof, and passing the hydrochloric acid gas generated thereby upwardly in counter-current flow with the descending sulphuric acid.

3. The herein described process of producing dry hydrochloric acid gas which consists in continuously introducing concentrated sulphuric acid at the top of a column of packing material, continuously introducing hydrochloric acid solution at a point intermediate the length of said column, continuously removing the resulting hydrochloric acid gas at the top of said column, and continuously removing the resulting diluted sulphuric acid at a point below said packing.

4. The herein described process of producing hydrochloric acid gas which comprises the steps of maintaining a descending stream of concentrated sulphuric acid, generating moist hydrochloric acid gas in the lower portion of said stream by the introduction of hydrochloric acid solution thereinto, contacting said moist hydrochloric acid gas with the concentrated sulphuric acid in the upper portion of said stream to remove the moisture, and regulating the flow of concentrated sulphuric acid and hydrochloric acid solution so that the resulting diluted sulphuric acid is of a strength of not less than 60° Bé.

In testimony whereof, I affix my signature.

GEORGE P. ADAMSON.